United States Patent

[11] 3,603,920

| | | |
|---|---|---|
| [72] | Inventor | Wolfgang Richard Ernst Stedtnitz<br>Bremen, Germany |
| [21] | Appl. No. | 850,146 |
| [22] | Filed | Aug. 14, 1969 |
| [45] | Patented | Sept. 7, 1971 |
| [73] | Assignee | Fried Krupp Gesellschaft mit beschrankter Haftung<br>Essen, Germany |
| [32] | Priority | Sept. 19, 1968 |
| [33] | | Germany |
| [31] | | P 17 98 276.2 |

[54] VELOCITY MEASURING DEVICE
12 Claims, 10 Drawing Figs.

[52] U.S. Cl. .................................................. 340/3 D
[51] Int. Cl. .................................................. G01s 9/66
[50] Field of Search ......................................... 340/3, 1, 3
D

[56] References Cited
UNITED STATES PATENTS
3,257,638  6/1966  Kritz et al. ................... 340/3

Primary Examiner—Richard A. Farley
Attorney—Spencer & Kaye

ABSTRACT: Apparatus for determining the velocity and direction of movement of a vehicle by measuring the Doppler effect, which apparatus includes an array of individual transducer elements mounted on the bottom of the vehicle, each element including means for sending and receiving sound signals and being equidistantly spaced from adjacent elements. Multiphase signal-generating means are provided to generate a plurality of signals of substantially similar frequency to produce sound waves from the transducer elements, with the signals each having a different phase. The transducer elements are electrically connected into groups, the number of groups being a multiple of the number of phase signals produced by the multiphase generator. The transducer elements of each group are arranged in a line, and the lines formed by each group are parallel to the lines formed by other groups and occupy a common plane. A signal of a single phase is applied to each group in cyclical repetition to produce a directive signal from the entire array of transducer elements. A frequency evaluating circuit is provided to evaluate the frequency of signals produced by sound waves striking the transducer elements and a scanner means is provided to successively connect each group of transducer elements to the frequency-evaluating circuit in a cycle having substantially the same period as the cyclical repetition of the sound radiating signal.

PATENTED SEP 7 1971 3,603,920

Inventor:
Wolfgang Richard Ernst Stedtnitz
By: Spencer & Kaye
Attorneys

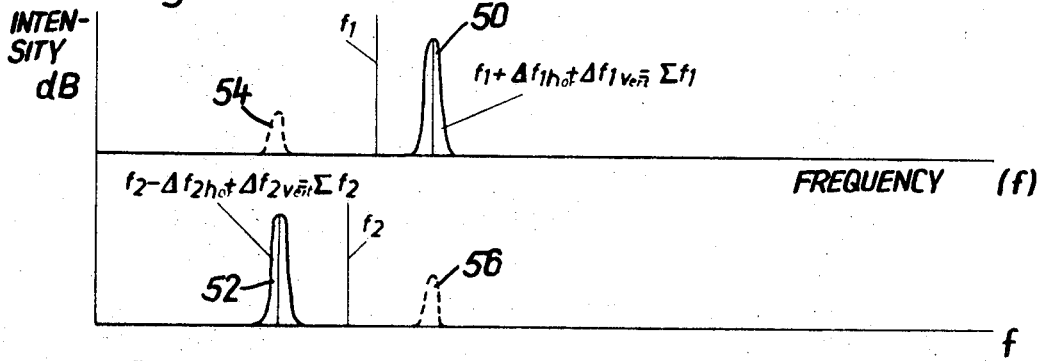
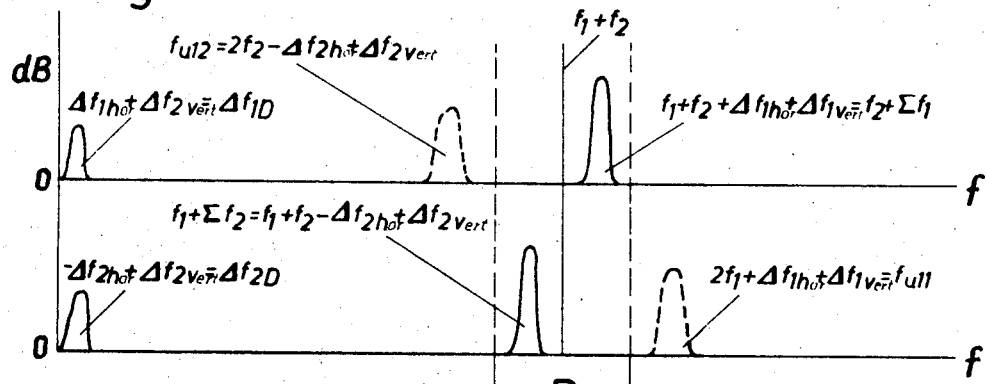
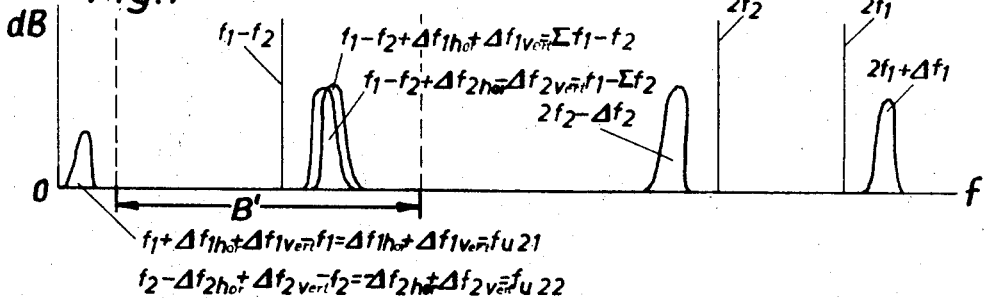

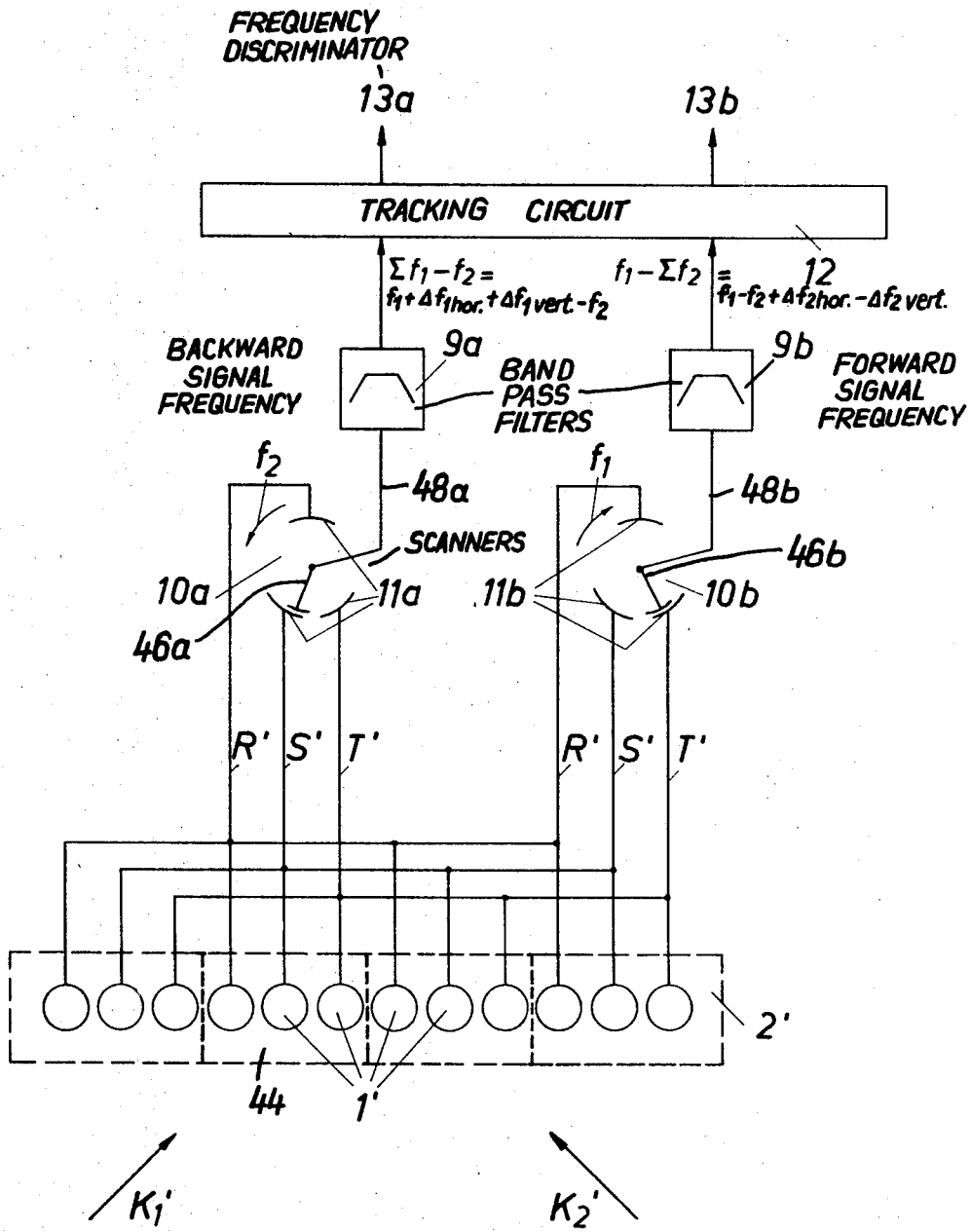

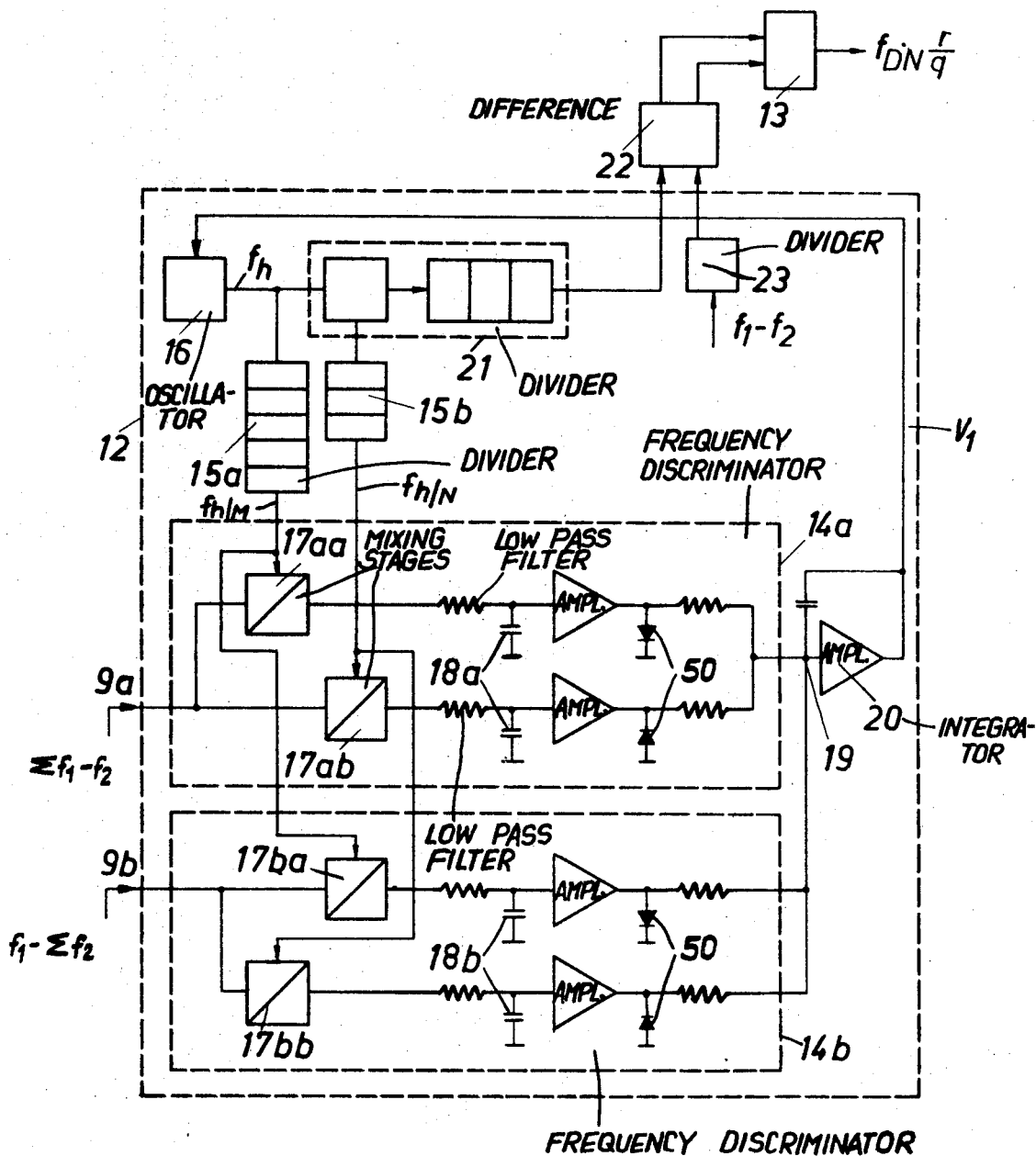

VELOCITY MEASURING DEVICE

BACKGROUND OF THE INVENTION

This invention relates to devices for determining the velocity and/or direction of vehicles by measuring the Doppler effect by means of sound wave beams inclined to the horizontal at a fixed angle, hereafter designated $\alpha$.

In devices of this type it is common to work with several sound beams, so-called Doppler feelers or Doppler beams. Frequently the Doppler feelers of the separate beams are displaced from each other by 90° in azimuth in order to record the motion of a vehicle in both coordinate directions of a plane, for example in the direction in which the vehicle is headed and in a direction transverse to the heading so as to be able to determine sidewise drift and the axial direction of movement. The fixed angle $\alpha$ at which the beams radiate downward is usually about 45° or 60° to the horizontal and the reflected wave is received in the same direction. For every radiated feeler beam provision is made for receipt of a corresponding reflected beam. For example, if Doppler beams are arranged in pairs, one radiating in a forward direction and the other in a backward direction, and the frequency difference between the beam reflected from the forward direction and that reflected from the backward direction is measured, the Doppler frequency is immediately measurable. This method is known under the name of Janus Method.

However, considerable difficulties exist in obtaining readings which are exact to a high degree of accuracy since the frequency of the reflected beam will be affected by changes in the velocity of propagation of the sound wave, which occur as the beam passes through different regions, for example through water having different temperatures. Consequently, adjustments must be made for changes in sound velocity, and this in practice is difficult.

Furthermore, there is a problem of finding suitable arrangements of transducer elements which can be simply mounted on the floor of a vehicle and which have a favorable shape with regard to fluid flow.

One known arrangement includes individual transducer elements mounted on two conical-shaped mounts. Four transducer elements are mounted on a conical-shaped mount for producing four emitted beams, and four more transducer elements are mounted on another cone provided for receiving the four reflected beams. The two cones, each of which carries four transducer elements, are arranged either one on top of the other or alongside one another, to decouple the emitted and the received beams. This arrangement is suitable when the vehicle travels at a low velocity. However, because of the exposed position of the mounts underneath the vessel, they are highly susceptible to damage when the vessel travels in shallow water.

Another type of transducer arrangement uses an array of individual transducer elements which together produce a directive sound beam. The individual elements are mounted equidistantly from each other, and they are provided with voltages having a varying phase difference. Time delay devices or phase reversal devices are provided to produce this varying phase difference. Such transducer arrays have an advantage in that they can be installed flat against the bottom surface of a vehicle and produce the required inclined radiation or concentrated sound beams for Doppler measurements. However, the time delay devices are expensive and are difficult to bring into balance.

One arrangement of this type utilizes two inclined radiating beams formed by feeding the transducer elements alternately with voltages of zero and 180° phase difference. The angle between the two main beams depends in this case on a separation of the individual transducer elements and the narrowness of the main beams depends on the number of transducer elements used. German Pat. No. 861,660 discloses a method for receiving the two main beams separately. The transducer elements are arranged at such a distance from one another that the voltages arising at the separate elements on reception have phase differences of 90°. By using phase correct addition and subtraction it is possible to obtain two partial voltages corresponding to the two received beams.

SUMMARY OF THE INVENTION

Among the objects of the present invention is the provision of a device of the above-described type which allows with simple means a determination of the Doppler effect, which determination is independent of the velocity of sound.

A further object of the invention is the provision of such a device which makes possible economy of manufacture in that it utilizes a three-phase generator in place of more expensive prior art time delay devices for producing a phase difference of the signal emitted by individual transducer elements.

A further object of the invention is the provision of a device which may emit highly directional beams without requiring the use of apparatus which projects from the bottom of the vehicle, and which may be subject to damage, or adversely influence fluid flow.

Briefly stated, these and other objects of the invention are achieved by providing a plurality of transducer elements which are supported from the lower surface of a vehicle, and which are equidistantly spaced from each other and electrically connected into groups. The influence of sound velocity on the Doppler frequency is eliminated, as will be explained in more detail later, because the radiation angle $\alpha$, which depends on the sound velocity changes in just such a manner that the influence of sound velocity on the Doppler frequency is eliminated.

The individual transducer elements are connected to a multiphase generator, in groups, one after another, in a regularly repeating cycle, to produce concentrated radiated sound beams from the entire array which have maximum intensity in the desired direction. In order to use the transducer elements as receivers for the reflected sound beams, a scanning means is provided which connects the groups of individual transducer elements to a frequency evaluating circuit in a regularly repeating cycle which is substantially identical in each period to that of the cycle by which the radiated signal is produced so that the array has the same directivity as a receiver as it has as an emitter.

BRIEF DESCRIPTION OF THE DRAWINGS

FIG. 5 is a graph showing the frequencies of the radiated and received signals.

FIG. 6 is a graph showing the frequencies received by the transducer array of the present invention as passed by the scanner 1. It is operated in its reverse direction.

FIG. 7 is a graph showing the frequency of the signals received and passed by the scanner when it is operated in its forward direction.

FIG. 8 is a schematic diagram showing the receiving circuit connections to the transducer elements of the present invention.

FIG. 9 is a schematic diagram of the tracker circuit of the present invention.

DESCRIPTION OF THE PREFERRED EMBODIMENTS

Figure 1A:
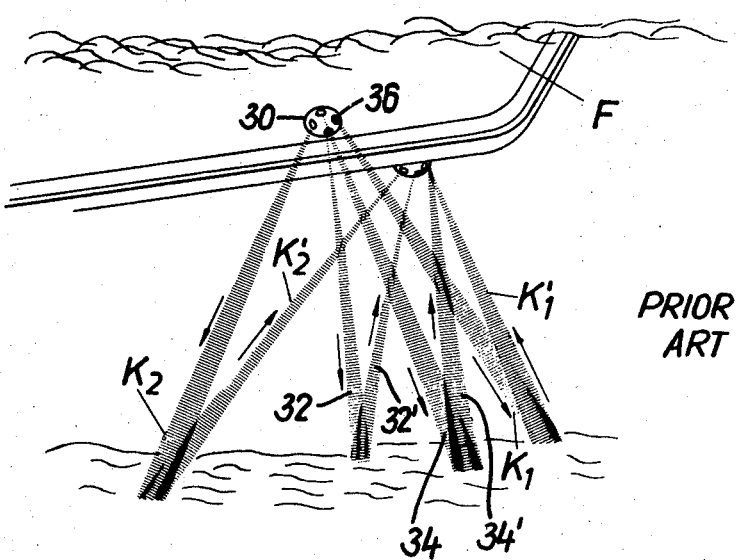
FIG. 1a is a perspective showing a water vehicle having a device for measuring velocity and direction of the vehicle according to the Janus Method.
Figure 1B:
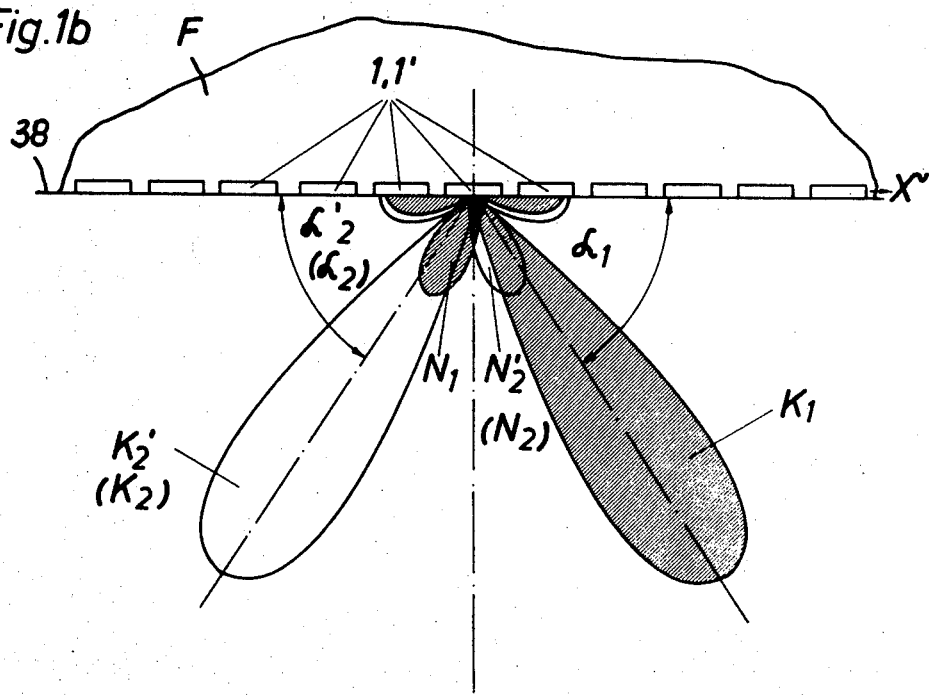
FIG. 1b is a lobe diagram showing two directional characteristics of the apparatus in one plane, specifically, the radiated forward characteristic and the received backward characteristic.

Referring now to FIGS. 1a and 1b of the drawings, there is shown a water vehicle F which has a transducer array 30 mounted on its bottom. In order to more clearly show the separate radiated and reflected sound beams, a prior art device utilizing transducer elements mounted on separate cones 36 is illustrated, rather than the flat transducer array of the present invention. This transducer array, both in the case of the prior art device and in the case of the present invention, produces sound beams $K_1$ which are sloped downwardly at an angle $\alpha_1$, as shown in FIG. 1b, and rearwardly radiating sound beams $K_2$ which slope downwardly at an angle $\alpha_2$ equal in magnitude to $\alpha_1$. The transducer array also receives the reflected sound beam $K'_1$ from the water bottom and resulting from the beam $K_1$ and the reflected beam $K'_2$ resulting from beam $K_2$. The apparatus is also arranged to radiate a pair of similar sound beams 32 and 34 in opposite directions in a plane transverse to the plane occupied by the beams $K_1$ and $K_2$, and to receive the reflected sound beams 32' and 34' resulting from these beams 32 and 34.

In order to more clearly show receipt of the reflected beams, FIG. 1a shows a prior art arrangement in which the transducer array 30 is mounted on a pair of cones 36 which projects from the ship bottom and which are separated from each other. However, the transducer array 38 according to the present invention actually lies in a plane on the bottom surface of the vehicle F, and electrical connections are needed to produce only the sound beams $K_1$ and $K_2$ and to receive the reflected sound beams $K'_1$ and $K'_2$ which lie in the vertical plane X extending in the fore-and-aft direction of the vehicle. It will be understood that similar electrical connections are provided to radiate sound beams in the vertical plane Y extending transversely to the direction of movement of the vehicle.

Any suitable transducer element which can convert a supplied electrical signal into a sound wave may be utilized. These transducer elements are well known in their art and have been described e.g., by G. Tucker and B, K, Gazey in "Applied Underwater Acoustics," Pergamon Press Ltd., C: 1966, Library of Congress Catalog Card No. 66–18403, there especially in Chapter 5.1 through 5.3 and FIG. 5.4 "Disc."

Figure 2:
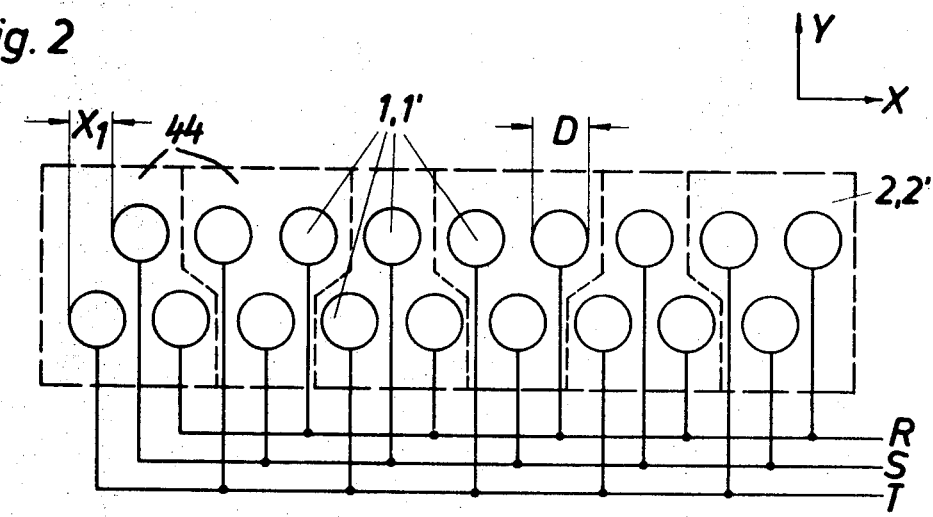
FIG. 2 shows a series of transducer elements according to the present invention as connected to a three-phase generator.
Figure 3:
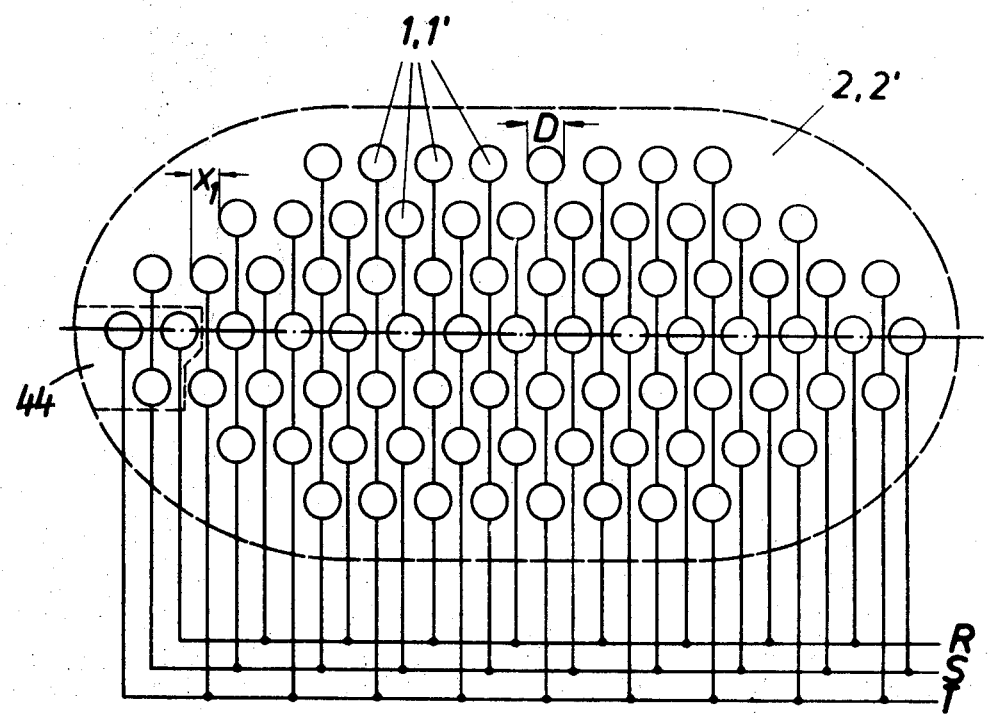
FIG. 3 shows an array of transducer elements according to the present invention.

The individual transducers are disk-shaped and act as both transmitters 1 and receivers 1' and hence are so designated by both reference numerals in FIGS. 1 to 3. The transducer elements are arranged in groups 2, 2' in which the transducer elements are arranged in equally spaced parallel lines. A relatively simple group containing only two lines of transducer elements is shown in FIG. 2; it is necessary that there be at least two lines of transducer elements since it is desirable that each individual transducer element have a diameter D which is approximately equal to the wave length of the sound beam which is to be projected, and it is also necessary that the spacing $X_1$ between adjacent transducer elements be also approximately equal to the wave length of sound in the coordinate direction in which the sound beam is to be projected. FIG. 3 illustrates another possible, and preferred, arrangement of transducer elements in which the group 2, 2' is elliptical and contains a large number of lines of transducer elements. The needed number of transducer elements 1 is determined in a known manner as a function of the particular desired directional characteristics; the elliptical arrangement being useful in minimizing undesirable side lobes.

Figure 4:
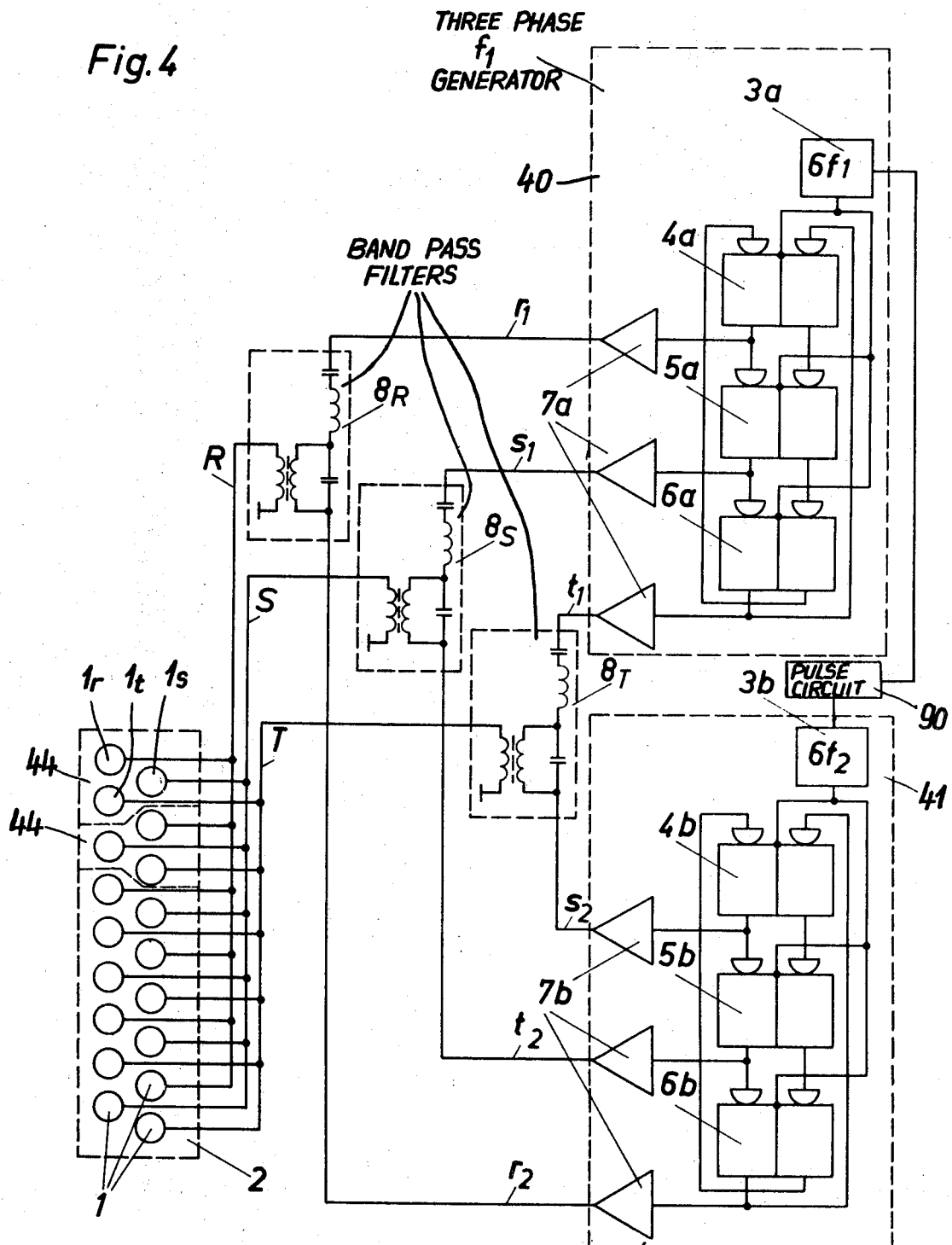
FIG. 4 is a schematic diagram showing the circuit utilized to produce a radiated sound signal from transducer elements according to the present invention.

The individual transducer elements are connected, for operation as sound transmitters 1, to a pair of three-phase signal generators 40 and 41, as shown in FIG. 4, which are described in detail hereafter. Generator 40 produces a signal having a frequency $f_1$ for producing the forwardly projecting sound beam $K_1$ and generator 41 produces a closely related, but different frequency $f_2$ for producing the rearwardly projecting beam $K_2$.

The individual transducer elements are, for performing their function as receivers, connected to a frequency evaluating tracking circuit 12, as illustrated in FIG. 8, which will be described in more detail hereafter in conjunction with the description of that Figure and of FIG. 9 which shows additional details of the tracking circuit 12.

Referring now to FIG. 4 it will be seen that each transducer element in its capacity as a transmitter 1 is one of a set of three elements which are respectively connected via lines R, S or T, through band-pass filters $8_R$, $8_S$ or $8_T$, to one of the three outputs $7_a$ of three-phase generator 40, and also to one of the three outputs $7_b$ of the three-phase generator 41.

The three-phase generator 40 produces, at its outputs, signals having the same frequency $f_1$ but having a phase difference of 120° from one another. Similarly the three-phase generator 41 produces, at its outputs, signals at a frequency $f_2$ which are separated from each other by phased angles of 120°. Filters 8 operate in a known manner to filter sinusoidal waves at the primary frequency from the square wave signals applied thereto.

Band-pass filters $8_R$, $8_S$ and $8_T$ are connected to the output terminals $7a$ via lines $r_1$, $s_1$ and $t_1$, respectively. However, they are connected to the output terminals $7b$ of generator 41 via lines $r_2$, $t_2$, and $s_2$, respectively. By virtue of this difference, the $f_1$ signals of generator 40 are applied to a series of adjacent transducer elements $l_r$, $l_s$ and $l_t$ in each elemental set 44 in the order R, S, T to have a phase relation that progresses in a forward sense. This direction will hereafter be referred to as the forward direction. This direction produces a concentrated beam $K_1$ of sound waves inclined at the angle $\alpha_1$, as shown in FIG. 1b and extending in the forward direction. As is well known an array of sound projectors provided with signals having a phase difference produces waves which reinforce each other in certain directions and cancel in other directions so that the sound waves have a particular directivity depending upon the frequency, the velocity of sound, the wave length, etc. This is discussed in greater detail hereafter in connection with the description of the operation of the device.

However, the leads to the generator 41 are connected so as to produce a phasing of the individual transducer elements in the reverse sense; that is, in the order T, S, R in each set 44. This will hereafter be referred to as the reverse direction. The result of this is that a beam $K_2$ having an inclination to the horizontal in the reverse direction $\alpha_2$ is produced. As illustrated in FIG. 2, in the coordinate plane X this angle $\alpha_2$ extends in a direction opposite to that of $\alpha_1$.

In order to produce signals at the frequencies $f_1$ and $f_2$ and having phases differing by 120°, the generators 40 and 41 include pulse generators 3a and 3b, respectively, which produce a pulse frequency of $(3j)f_1$ and $(3j)f_2$, respectively, where $j$ is an integer, in this case 2. An appropriate circuit is provided within the generator to reduce this higher oscillator frequency down to three separate frequency signals of $f_1$ or $f_2$, respectively, which are separated by a phase difference of 120°. The factor $j$ depends upon the particular characteristics of the frequency reduction circuits used. Those skilled in the art would be able to readily assemble an appropriate circuit. In the particular example shown each generator includes three JK flip-flops 4a, 5a and 6a or 4b, 5b and 6b, respectively. Each set of the three flip-flops is connected in a ring arrangement. The three flip-flops of each generator deliver square wave signals at the appropriate frequency $f_1$ or $f_2$ and the appropriate phase relation to the output stages 7a or 7b. The phase shifted wave train signals $r_i$, $s_i$, and $t_i$ (the subscript $i$ being equal to 1,2) are then connected in a star connection to the group 2 of transducer elements 1. The star connection, wherein the other terminal of all transducer elements 1 is connected to circuit ground, is not shown in FIG. 4 to avoid confusion.

Unavoidable side lobes N as shown in FIG. 1b are always present. The side lobe $N_1$ of beam $K_1$ may overlap the beam $K_2$, so that its reflected beam may be confused with the reflected beam $K'_2$. To avoid this, the magnitude of the side lobes may be reduced by conventional methods, such as by staggering of the transducer elements 1 of a group 2 in an arrangement approximating an elliptical surface as shown in FIG. 3 and/or by circuitry means for the staggering of amplitudes. However, since it is impossible to completely prevent the overlapping of a side lobe N on a main beam, the result will be a lessened crosstalk attenuation.

Referring now to FIGS. 8 and 9 the circuitry for the receipt of the reflected sound beams and for evaluating the frequency received in order to measure the Doppler frequency and to determine the velocity of the vehicle is here briefly described. A more complete description of this portion of the circuit will be given after the principles upon which it operates are described, but a brief description will first be given to form a basis for describing these operative principles.

Referring to FIG 8 there is shown a group 2' of transducer elements 1' arranged to function as receivers. For simplicity the group is shown only schematically, it being understood that the arrangement is actually similar to one of those illustrated in FIGS. 2 and 3. Each element 1' of a set 44 is connected via lines R', S' or T' to both scanners 10a and 10b. While in FIG. 8 a mechanical analogue is shown in which the scanners include segmental contacts 11a or 11b connected to each of the three lines and successively contacted by a rotating switch arm 46a or 46b which rotates with a frequency $f_2$, in the case of scanner 10a, or a frequency $f_1$, in the case of scanner 10b, and contacts each of the three contacts at locations 120° apart on their path of rotation, it will be understood that a practical embodiment of the scanner can be a suitable electronic circuit, for instance one utilizing controlled field effect transistors. The electronic analogue of the rotating switch arm 46a of scanner 10a rotates in the forward direction, i.e., in the order R', S', T', while the analogue of rotating contact 46b rotates in the backward direction, i.e., T', S', R' as shown by the arrows.

The output of scanner 10a is fed through a band-pass filter 9a to tracking circuit 12 and the output of scanner 10b is fed via line 48b through a band-pass filter 9b to the tracking circuit.

The remaining structure of the receiver circuit will be discussed after the operation of the circuit is described.

The wavelength λ of the sound beam produced by the transducers depends upon the frequency $f_s$ of the radiated signal, it being understood that this frequency $f_s$ for the forward radiated beam $K_1$ and $f_2$ for the backward radiated beam $K_2$. The radiation direction angle α will depend upon the distance $X_1$ between adjacent transducer elements in the direction in which the beam is to be radiated. The value of $X_1$ is represented by:

$$X_1 = \alpha/3\cos\lambda \qquad (1)$$

The ⅓ factor derives from the 120° phase difference between the signals applied to successive transducers. For usual values of α of between 45° and 60°, $X_1$ has values between 0.67λ and about 0.5λ. Since the transducer elements 1 usually have a diameter D of about 0.9λ to 1.1λ the transducer elements must be arranged in at least two staggered lines as shown in FIGS. 2 and 3 so that the spacing $X_1$ in the X-direction is physically attainable. It follows that if transducer elements 1 of smaller diameter D are used, or if for some desired characteristic larger $X_1$ values are obtained, then the transducer elements 1 may be placed alongside one another in one row groups.

As is known, the Doppler frequency $\Delta f_D$ is given by the following equation:

$$\Delta f_D = 2v/C f_s \cos\alpha \qquad (2)$$

Where $v$ is the velocity of the vehicle, $f_s$ is the radiated sound beam frequency and $C$ is the velocity of sound in the medium traversed by the beam. Since from equation (1):

$$\cos\alpha = \lambda/3X_1$$

and the velocity of sound $C$ is equal to:

$$C = \alpha \cdot f_s$$

it can be easily derived that:

$$\Delta f_D = \left(\frac{2v}{\lambda f_s}\right)(f_s)\left(\frac{\lambda}{3X_1}\right) = \frac{2v}{3X_1} \qquad (3)$$

From equation (3) it will be seen that the remarkable property of the arrangement of transducer elements according to the present invention is that the sound velocity $C$ no longer appears as a factor in determining the value of $\Delta f_D$. In prior art apparatus adjustments had to be invariably made for variations occurring in the sound speed before computing the Doppler frequency With the present apparatus, the Doppler frequency $\Delta f_D$ is only dependent on the distance $X_1$ between the transducer elements and on the horizontal velocity $V$ of the vessel. Since the Doppler frequency $\Delta f_D$ is easily measurable, apparatus can be provided which will give a direct indication of the velocity This is of particular importance because in prior art methods continual variations in the value of $C$ cause errors in the Doppler frequency to continually accumulate while a distance measurement is being made and this significantly influences the accuracy of the measurement Thus, the independence of the resulting Doppler frequency from the value of $C$ is a central feature of this invention Since the arrangement of the transducer elements is symmetrical, a radiation is in principle obtainable to either of two sides. The direction in which the beam K will be radiated at its angle α depends only upon the sense of rotation, that is on the phase sequence of the signals applied to the transducer elements. Since the elements 1 are essentially linearly arranged it is possible to feed a group simultaneously with two superimposed rotational fields. As pointed out before, this is done by applying the frequency $f_1$ in the order R, S, T while the frequency $f_2$ is applied in the order T, S, R It is not necessary that the two frequencies $f_1$ and $f_2$ be identical; it is usually sufficient if the frequencies lie within the mechanical bandwidth of the transducer elements 1.

FIGS 5 to 7 show the frequency spectra of the signals appearing at certain points in a system according to the invention Frequencies produced by main lobe signals are shown in solid lines, and those by side lobe signals are shown in dotted lines.

FIG 5 shows the frequency distribution of the received signal 50 in the reflected forward beam $K'_1$, and the signal 52 that of the reflected backward beam $K'_2$ The signal 54 is that received in the reflected side lobe beam $N'_2$ and the signal 56 received in the reflected side lobe beam $N'_1$ The signal 50 has a Doppler frequency spectrum $\Sigma f_1$ whose value is $$\Sigma f_1 = f_1 + \Delta f_{1D}$$

Since $\Delta f_{1D}$ the Doppler frequency change of signal $f_1$ includes both horizontal and vertical components this equation becomes $$\Sigma f_1 = f_1 + \Delta f_{1\,hor} + \Delta f_{1\,vert}$$

The lower half of FIG. 5 shows the signals received from the backward direction. The signal 52 has a Doppler frequency spectrum $\Sigma f_2$ which is represented by:

$$\Sigma f_2 = f_2 - \Delta f_{2\,hor} + \Delta f_{2\,vert}$$

The minus sign for the horizontal Doppler frequency change component $\Delta f_{2\,hor}$ results from the fact that with forward vehicle motion, the Doppler effect reduces the frequency of the backward reflected signal $K'_2$.

In Doppler spectra $\Sigma f_1$ and $\Sigma f_2$ can be transposed into the same frequency band by mixing. To accomplish this there are two possibilities, either (1) the frequencies of the opposing beams may be added or (2) they may be subtracted.

According to possibility (1), in which the frequencies of the opposing beams are added to produce.

$$\Sigma f_1 + f_2 = f_1 + f_2 + \Delta f_{1\,hor} + \Delta f_{1\,vert};\text{ and}$$
$$\Sigma f_2 + f_1 = f_1 + f_2 - \Delta f_{2\,hor} + \Delta f_{2\,vert},$$

each addition thus represents a received Doppler spectrum plus an emitted frequency of the other beam The two sums differ from each other by $$\Delta f_{1\,hor} + \Delta f_{2\,hor}$$

In the foregoing equations:

$f_1$ is the radiation frequency of the forward beam $K_1$, $f_2$ is the radiation frequency of the backward sound beam $K_2$, $\Delta f_{1\,hor}$ is the Doppler frequency component of the received forward beam due to horizontal motion, $\Delta f_{2\ hor}$ is the Doppler frequency component of the received backward beam due to horizontal motion, $\Delta f_{1\ vert}$ is the Doppler frequency component of the forward beam due to vertical motion, and $\Delta f_{2\ vert}$ is the Doppler frequency component of the backward beam due to vertical motion.

FIG. 6 shows the positions of the Doppler spectra after transposing according to possibility (1) in which the beams are added. The spectra arising from the Doppler spectra and $\Sigma f_1$ and $\Sigma f_2$ due to crosstalk from the side lobes are:

for sides lobe $N'_1$, $\Sigma f_{u11} = 2f_1 + \Delta f_{1\ hor} + \Delta f_{1\ vert}$;

for side lobe $N'_2$, $\Sigma f_{u12} = 2f_2 - \Delta f_{2\ hor} + \Delta f_{2\ vert}$, where $\Delta f_{2\ hor} = \Delta f_{1\ hor}$ and $\Delta f_{2\ vert} = \Delta f_{1\ vert}$. Since, as seen in equation (3) the Doppler frequency $\Delta f_D$ is independent of the output frequency $f_s$, these crosstalk frequencies will lie outside a selected operational frequency region, or band, B. This region is bounded by the maximum anticipated Doppler frequency excursion and the crosstalk frequencies are readily filtered out by band-pass filters 9.

The other possibility, (2), is that the output frequencies of the opposing beams are subtracted to yield:

$\Sigma f_1 - f_2 = f_1 - f_2 + \Delta f_{1\ hor} + \Delta f_{1\ vert}$, $-\Sigma f_2 + f_1 = f_1 - f_2 + \Delta f_{1\ hor} - \Delta f_{2\ vert}$.

Addition of these quantities yields: $2(f_1 - f_2) + \Delta f_{1\ hor} + \Delta f_{2\ hor}$. Subtracting thereof: $+2(f_1 - f_2)$, the difference between the latter values is: $\Delta f_{1\ hor} + \Delta f_{2\ hor}$.

FIG. 7 shows the Doppler frequency spectra as shifted according to possibility (2). The low frequency spectra of the crosstalk frequencies arising under these conditions, namely:

for side lobe $N'_1$: $\Sigma f_{u21} = f_1 + \Delta f_{1\ vert} + \Delta f_{1\ hor} -$
$f_1 = \Delta f_{1\ hor} + \Delta f_{1\ vert}$ for side lobe $N'_2$: $\Sigma f_{u22} = f_2 - \Delta f_{2\ hor} + \Delta f_{2\ vert} -$
$f_2 = \Delta f_{2\ hor} + \Delta f_{2\ vert}$ are filtered out by filters 9 here having a passband in the range B'.

The practical effect of the frequency transposition which is performed is that interference of the side lobe N of one beam direction with the main beam K of the other beam direction is reduced by frequency selection in the receiver of the frequency components from the output frequencies $f_1$ and $f_2$ so that the side lobe attenuations for transmission and reception are added together. For example, if the side lobe attenuation for transmission is 12 db. then over an entire transmission and receiving path a side lobe attenuation of 24 db. is achieved. Without such frequency selection there would in contrast be only a side lobe attenuation totaling 12 db. which would considerably adversely affect the advantages of this invention.

In the considerations thus far concerning frequencies the three-phase aspect has not yet been considered. Actually, the frequencies $f_1$ and $f_2$ are fed in a three-phase manner to the group 2 of transducer elements 1. Likewise, the received Doppler spectra $\Sigma f_1$ and $\Sigma f_2$ of the received forward and backward beams $K'_1$ and $K'_2$ are superimposed in the form of three-phase signals when received at the group $2'$ of receiving transducer elements $1'$.

The foregoing description may help to show that the separating of the signals of the forward beam $K'_1$ and of the backward beam $K'_2$ is combined with frequency conversion in a very advantageous manner.

Referring to FIG. 8 it will be seen that the scanner 10a rotates at the frequency $f_2$ cyclically in the phase sequence $r, s, t$. The Doppler spectrum $\Sigma f_1$ coming from the forward beam $K'_1$ passes in the same phase sequence through transducer elements $1'$ and there arises at the output of 48a of scanner 10a a different spectrum $\Sigma f_1 - f_2$. The Doppler spectrum $\Sigma f_2$ arising from the backward beam $K'_2$ is, however, of the opposite phase sequence sense, thus giving rise to a sum spectrum $\Sigma f_2 + f_2$ at the output of scanner 10a. Since the difference spectrum will be centered at a relatively low frequency and the sum spectrum will be at a relatively high value the sum spectrum can be easily filtered out by filter 9a. The bandwidth B' is so selected that all expected difference spectra can be easily passed.

The second scanner 10b runs in the backward direction, that is, in the sequence $t, s, r$. Accordingly, a difference spectra $f_1 - \Sigma f_2$ arises from the main beam $K'_2$ received from the rear, while the sum spectrum $\Sigma f_1 + f_1$ also appears at the scanner output and is filtered out by filter 9b.

Reversing the rotational direction of the scanners 10a and 10b while maintaining the same rotational direction for producing the beams to be transmitted will cause the frequencies obtained at the scanner outputs to set forth for possibility (1). This will produce the following signals:

$\Sigma f_1 + f_2 = f_1 + f_2 + \Delta f_{1\ hor} + \Delta f_{1\ vert}$, and $\Sigma f_2 + f_1 = f_1 + f_2 - \Delta f_{2\ hor} + \Delta f_{2\ vert}$.

From these can be easily obtained by frequency subtraction, a spectrum $\Delta f_{DN} = \Delta f_{1\ hor} + \Delta f_{2\ hor}$. In this case, a sum spectrum will be created for the main beam and a difference spectrum will be created for the unwanted side lobe beam.

Whether the device of the present invention is designed to operate according to possibility (1) or possibility (2) is a matter of choice and depends on the expense involved in fabricating the circuitry; in principle both are of equal value. In a sequential or multiplex application it is possible to use only a single scanner.

In FIG. 9 the frequency detector 12 is shown in greater detail. This detector is designed to process the transposed Doppler spectra according to possibility (2) in which the difference spectra $\Sigma f_1 - f_2$ and $f_1 - \Sigma f_2$ are used. Its function is to determine the weighted center frequency of a transposed spectrum in a continuous manner and to store the weighted center frequency in the case of an interruption in the signal in order that a later path integration may not be interrupted. Thus, for example in an automatic navigating system a continuous record of the path being followed by a vehicle can be made, notwithstanding temporary interruption in the signals. The only assumption made is that during signal interruptions the vehicle continues to follow the same path as immediately before the interruption. The weighted center frequency is, after appropriate transformation which will be described below, continually fed to another Doppler frequency calculator 13, which can, for example, turn the velocity information into path data with north as the reference direction.

The output of the band-pass filters 9a and 9b are continuously fed to frequency discriminators 14a and 14b, respectively, which determine whether a transposed Doppler spectrum lies between two frequencies $f_{h/m}$ and $f_{h/n}$ produced by respective divider circuits 15a and 15a from an auxiliary frequency $f_h$ produced in an auxiliary oscillator 16 in the form of a voltage-to-frequency converter, $m$ and $n$ being integers so that circuits 15a and 15b can be simple frequency dividers.

Frequency discriminator 14a includes mixing stages 17aa and 17ab. Stage 17aa receives the comparison signal at frequency $f_{h/m}$ and mixes it with the spectrum signal $\Sigma f_1 - f_2$ from band-pass filter 9a. The resulting frequency signal is fed through a low pass filter 18a, and is rectified by a rectifier 50 and is supplied to a summation point 19. Mixing stage 17ab mixes the other signal at the frequency $f_{h/n}$ with the $\Sigma f_1 - f_2$ signal and passes it through a similar low pass filter 18a and rectifier 50 to the same summation point.

Frequency discriminator 14b contains similar mixing stages 17ba and 17bb, similar low pass filters 18b and rectifiers 50 and is connected to the same summation point 19.

The thus resulting spectra:

$f_{h/m} - (\Sigma f_1 - f_2)$ and $f_1 - \Sigma f_2 - f_{h/n}$ are fed through low pass filters 18a and 18b having equal cutoff frequencies to attenuate them as a function of frequency and to rectify them in the opposite polarity to one another. If the weighted frequency lies midway between $f_{h/m}$ and $f_{h/n}$ then the output current of the frequency discriminators 14a and 14b equals zero while if there is a deviation from the midfrequency the output current is positive or negative by an amount proportional to the deviation.

For pure horizontal movement of the vehicle F the transposed Doppler spectra of the forward and backward beams $K'_1$ and $K'_2$ are equal and the output currents of the frequency discriminators 14a and 14b are equal in amplitude and polarity. From the summation point 19 the outputs are fed to an integrator 20. The output voltage $V_1$ of the integrator 20 controls the auxiliary frequency $f_h$ produced by the auxiliary oscillator 16. The frequency discriminators 14a and 14b, the integrator 20 and the auxiliary oscillator 16, including the distributor circuits 15a and 15b, thus form a closed feedback circuit for varying the value of $f_h$ so as to bring the output currents of the frequency discriminators 14a and 14b at the summation point 19 to a value of zero.

If the horizontal movement of vehicle F is supplemented by a periodical vertical movement, then the output currents of the two frequency discriminators 14a and 14b are of opposite signs but equal amplitude because the vertical components of the Doppler spectra in the two channels of the two frequency discriminators 14a and 14b have opposite signs. At the summation point 19, however, the rectified current components due to the vertical Doppler spectrum components cancel one another so that the output voltage $V_1$ of integrator 20 is proportional only to the horizontal velocity and this alone is stored in case of signal interruption. The advantage of this arrangement lies in that only one integrator 20 is needed, and this need generally follow only slow horizontal velocity changes of the vehicle F.

The division ratio of the divider circuits 15a and 15b must, in order that $f_{h/m}$ and $f_{h/n}$ be spaced equally from the weighted center frequency of each Doppler spectrum, satisfy the following conditions:

$$f_{h/m}-(f_1-f_2+\Delta f_{Dx})=(f_1-f_2+\Delta f_{Dx})-f_{h/n}$$

where $\Delta f_{Dx}$ is the combined horizontal Doppler component of the two received signals. Preferably, the division ratios are selected according to the further relationship: $(f_1-f_2+\Delta f_{Dx})r/q=f_{h/p}$; $p$, $q$ and $r$ are integers, in order to obtain at the input of the Doppler calculator 13 exactly one predictable pulse number per unit of path distance.

In order to obtain a good adjustment control rate, the difference $f_{h/m}-(f_1-f_2+\Delta f_{Dx})$ must be kept as small as possible. The ratio $r/q$ is, as one specific example, ⅔. Another divider 21 having a frequency division ratio $p$ thus produces a signal at a velocity-dependent frequency $f_r$ which is fed to a frequency difference stage 22 where the frequency quantity $(f_1-f_2)r/q$ supplied by a frequency divider 23 is subtracted from it. The resulting output is fed to the Doppler calculator 13.

The values of the factors $m$, $n$, $p$ are so chosen that the cost for the dividers 15 and 21 is kept to a minimum. The number of possibilities is very limited if costs are watched and if design is kept to specific tasks. For example, the following values are chosen:

$$m=2\times 12$$
$$n=2\times 15$$
$$p=2\times 20,$$

(the factor 2 being necessary in order to obtain a pulse length to pulse period ratio of 1:1 at the outputs of the parallely operating divider circuits 15a and 15b). If, for example, $f_1-f_2+\Delta f_{Dx}$ is 3 kHz., then:

$$f_h=80 \text{ kHz.}$$
$$f_{h/m}=3.333 \text{ kHz.}$$
$$f_{h/n}=2.666 \text{ kHz.}$$
$$f_{h/p}=2.0 \text{ kHz.}$$

and the upper limit frequencies of the low pass filters in the frequency discriminators 14a and 14b are $\omega_o=2\pi\cdot 333$ Hz. In order to obtain only the Doppler signal that is of interest for further evaluation, the difference between the number of pulses which is proportional to the velocity-dependent frequency $f_r$ from divider 21, and the number of pulses of divider 23 is formed in difference stage 22, whereby, for divider 21: $(f_1-f_2+\Delta f_{Dx})r/g=f_{h/p}$, and for divider 23: $-(f_1-f_2)r/q$, so that the output frequency from difference circuit 22 is $\Delta f_{Dx}\cdot r/q$ and calculator 13 can produce an output proportional to $f_{Dx}\cdot r/q$.

The divider 23 performs the task of providing the frequency difference $(f_1-f_2)$ with the same scale factor $r/q$ as the Doppler spectrum $(f_1-f_2+\Delta f_{Dx})$. The difference stage 22 provides at two outputs the frequency $f_{Dx}\cdot r/q$, the first output emitting pulses for forward motion, the second for backward motion. The pulses are fed to the Doppler calculator 13 and can, for example, serve to indicate by way of counters the path covered. Such calculators are quite well known in the art and, in their simplest form, need only provide a count of the received pulses as a function of the time during which the count is carried out.

In one modification of the described Doppler measurement apparatus it is possible to operate one and the same group of transducer elements in a pulsed manner, for example by pulse circuit 90 of FIG. 4 to operate as both transmitters and receivers. This type of operation wherein signals are transmitted in the form of spaced modulated pulses and the received signals are detected during the intervals between transmitted pulses, is quite common in the art.

Furthermore, it can be effective to connect intermediate amplifiers between the receiver transducers and electronic scanners.

While the described apparatus treats only motion of a vehicle F in one coordinate direction, it will be immediately obvious that the basic principle can be applied for handling two coordinate directions using appropriate circuitry means angularly displaced by 90° from the above-described first pair. The example above, which was directed to water vehicles, is not to be limited to water vehicles. The invention is equally applicable to land vehicles or air-cushion vehicles.

It will be understood that the above description of the present invention is susceptible to various modifications, changes and adaptations.

I claim:

1. A device for determining the velocity and/or direction of movement of a vehicle by measuring the Doppler effect by means of concentrated sound wave beams inclined from the horizontal at an angle, comprising, in combination:

a. an array formed by a plurality of individual transducer elements arranged to be mounted on the vehicle surface, each element including means for sending and receiving sound signals, b. said transducer elements being arranged in groups with adjacent transducer elements being equally spaced, c. multiphase signal generating means for generating a plurality of signals of substantially similar frequency for producing a signal to be applied to said transducer elements to produce sound waves said signals each having a different phase, d. said transducer elements within each group being divided into sets, the number of elements in each set being equal in number to the number of phased signals produced by said multiphase generator, e. means electrically connecting said multiphase signal generating means to said transducer elements for applying a signal of a single phase to one element in each set in cyclical repetition to thereby radiate a sound signal with the signal radiated by each element of the set having a phase difference from the signals radiated by other elements of the set to thereby produce a directive signal from the entire array of transducer elements, f. a frequency evaluating circuit for evaluating the frequency of signals produced by sound waves striking said transducer elements, and g. scanner means for successively connecting each element of a set of transducer elements to said frequency evaluating circuit at a predetermined cyclic rate.

2. The combination defined in claim 1 in which the number of separate phase signals produced by said multiphase generator is three.

3. The combination defined in claim 1 including h. a second multiphase signal generating means for generating a plurality of signals of substantially similar frequency to those produced by said first mentioned multiphase signal generating means for producing a signal to be also applied to said transducer elements to produce sound waves, said separate signals produced by said second multiphase signal-generating means each having a different phase, and i. means electrically connecting said second multiphase signal-generating means to said transducer elements for applying a signal of a single phase to each group in anticyclical repetition in an order opposite in direction to the direction in which the separate signals of said first multiphase signal-generating means are applied to the group, at the same time that the signal of the first multiphase signal-generating means is being applied to the transducer elements in cyclical repetition.

4. The combination defined in claim 3 wherein said first and second multiphase signal generators produce signals differing slightly in frequency by an amount $\Delta f = f_1 - f_2$.

5. The combination defined in claim 4, including means for evaluating a frequency difference $\Delta f_D$ between the received frequencies obtained from reflections of the sound waves produced by said first and said second multiphase signal generating means.

6. The combination defined in claim 5 including means for producing an output voltage proportional to:

$(f_1 + \Delta f_{1D} - f_2) + (f_2 + f_{2D} - f_1) - 1 \ 2(f_1 - f_2)$ from the algebraic sum of the difference between the reflected frequency received from the sound signal produced by the first multiphase generator ($\Sigma f_1$) and the radiated frequency of the sound wave produced by the second multiphase generator ($f_2$), the difference of the received frequency of the reflected signal produced by said second multiphase generator ($\Sigma f_2$) and the radiated frequency of the sound wave produced by the first multiphase generator ($f_1$) and twice the difference of the two radiated frequencies.

7. The combination defined in claim 6 wherein said means for forming an average value is in the form of a tracker.

8. The combination defined in claim 7 wherein said tracker means includes:

a. a first frequency discriminating means;
b. a second frequency discriminating means;
c. said scanning means including means for connecting the first frequency discriminating means to each element of a set in the cyclic direction, and means connecting the second frequency discriminating means to each element of a set in anticyclic direction;
d. each of said discriminator means including means for producing rectified voltages proportional to the frequency deviations $\Sigma f_1 - f_2$ and $\Sigma f_2 - f_1$, control circuit means for controlling output voltage $V_1$ which is integrated to the voltage output proportional to the said frequency deviations;
e. auxiliary oscillator means for forming an auxiliary frequency which is proportional to the output voltage for controlling the frequency deviations; and
f. means utilizing the output voltage $V_1$ as a measure for the Doppler effect.

9. The combination of claim 1 including means connecting the multiphase signal generator means to the transducer elements in pulses, and means blocking the frequency evaluating circuit during the radiation pulses.

10. The combination defined in claim 1 wherein the transducer elements are arranged in lines which are parallel to each other.

11. The combination defined in claim 1 wherein the transducer elements of different sets which are supplied with a signal of the same phase at the same time are arranged in lines which are parallel to each other.

12. The combination defined in claim 1 wherein the spacing between the transducer elements of each group is substantially equal to the wavelength of the radiated sound signal in the medium through which the sound travels.